(12) United States Patent
Brown (10) Patent No.: US 10,701,892 B2
(45) Date of Patent: Jul. 7, 2020

(54) SYSTEM AND METHOD FOR AUTOMATICALLY FLUSHING PET URINE FROM A LITTER BOX

(71) Applicant: Wm Dale Brown, Bainbridge Island, WA (US)

(72) Inventor: Wm Dale Brown, Bainbridge Island, WA (US)

( * ) Notice: Subject to any disclaimer, the term of this patent is extended or adjusted under 35 U.S.C. 154(b) by 0 days.

(21) Appl. No.: 16/239,886

(22) Filed: Jan. 4, 2019

(65) Prior Publication Data

US 2019/0208738 A1    Jul. 11, 2019

Related U.S. Application Data

(63) Continuation of application No. 15/684,766, filed on Aug. 23, 2017, now Pat. No. 10,212,915.

(51) Int. Cl.
*A01K 1/01* (2006.01)
*A01K 29/00* (2006.01)
*A01K 1/015* (2006.01)

(52) U.S. Cl.
CPC .......... *A01K 1/011* (2013.01); *A01K 1/0114* (2013.01); *A01K 1/0152* (2013.01); *A01K 1/0155* (2013.01)

(58) Field of Classification Search
CPC .............................. A01K 1/0152; A01K 1/0155
USPC .......................................................... 119/171
See application file for complete search history.

(56) References Cited

U.S. PATENT DOCUMENTS

| | | | |
|---|---|---|---|
| 1,346,898 A | | 7/1920 | Kingsbury |
| 2,766,406 A | | 10/1956 | Schwarzkopf |
| 3,227,138 A | | 1/1966 | Campbell |
| 3,339,578 A | | 9/1967 | Smith |
| 3,741,683 A | | 6/1973 | McTamaney et al. |
| 3,793,988 A | | 2/1974 | Traeger |
| 3,965,863 A | | 6/1976 | Scott |
| 4,341,180 A | * | 7/1982 | Cortigene ............ A01K 1/0152 119/172 |
| 4,480,901 A | | 11/1984 | Osegowitsch et al. |
| 4,607,594 A | * | 8/1986 | Thacker ............... A01K 1/0155 119/171 |
| 4,649,578 A | | 3/1987 | Vargo |
| 5,113,801 A | | 5/1992 | Rotstein et al. |
| 5,184,574 A | | 2/1993 | Kirk et al. |
| 5,231,953 A | | 8/1993 | Garrett |

(Continued)

*Primary Examiner* — David J Parsley
(74) *Attorney, Agent, or Firm* — FisherBroyles LLP; Kevin D. Jablonski (57) ABSTRACT

A system and method for automatically flushing urine from a pet litter box are disclosed. In one embodiment, the system and method may be directed to a combination of a urine-separating pet litter box with odor controlling conditionally non-absorbent litter and an automatic flushing device. The urine-separating pet litter box includes an upper litter tray with a perforated bottom and a lower liquid holding tank, which holds water inside. The lower liquid holding tank is connected to water intake pipes and a drainpipe and flushes the urine and holding water and fills freshwater in the lower liquid holding tank by detecting a water level of the holding water in the lower liquid holding tank with sensors. The flushing was performed by using a Venturi pump effect to control two electrical valves open or close. In some embodiment, Sodium Sesquicarbonate (SSC) may be used as conditionally non-absorbent litter for complete disposal of feces.

9 Claims, 8 Drawing Sheets

(56) References Cited

U.S. PATENT DOCUMENTS

| | | | | |
|---|---|---|---|---|
| 5,303,676 | A * | 4/1994 | Lawson | A01K 1/0154 119/173 |
| 5,421,291 | A * | 6/1995 | Lawson | A01K 1/0154 119/173 |
| 5,450,817 | A * | 9/1995 | Hahn | A01K 1/0154 119/173 |
| 5,507,248 | A | 4/1996 | Gabbert | |
| 5,609,123 | A | 3/1997 | Luke et al. | |
| 5,996,533 | A | 12/1999 | Gordon | |
| 6,287,550 | B1 * | 9/2001 | Trinh | A01K 1/0152 119/171 |
| 6,294,118 | B1 * | 9/2001 | Huber | A01K 1/0152 119/173 |
| 6,612,812 | B1 | 9/2003 | Gard | |
| 6,615,765 | B1 | 9/2003 | Thomas | |
| 6,730,653 | B1 | 5/2004 | Smith et al. | |
| 6,877,170 | B1 | 4/2005 | Quintana et al. | |
| 8,522,720 | B2 | 9/2013 | Boxley et al. | |
| 8,722,031 | B2 * | 5/2014 | Lawson | A61L 9/01 424/76.6 |
| 9,066,496 | B2 | 6/2015 | Hymes | |
| 2004/0106745 | A1 | 6/2004 | Nakashima et al. | |
| 2005/0241589 | A1 | 11/2005 | Forster | |
| 2008/0171069 | A1 | 7/2008 | Pascal et al. | |
| 2009/0000562 | A1 * | 1/2009 | Jenkins | A01K 1/0154 119/173 |
| 2011/0099890 | A1 | 5/2011 | Bohlig et al. | |
| 2013/0213309 | A1 | 8/2013 | Wang et al. | |
| 2015/0097141 | A1 | 4/2015 | Rumberger et al. | |

\* cited by examiner

SYSTEM AND METHOD FOR AUTOMATICALLY FLUSHING PET URINE FROM A LITTER BOX

BACKGROUND

Indoor pets, such as cats and dogs, use a litter container for urination and defecation. The litter container is usually placed at one location inside of a house so that cats or dogs can learn to urinate or defecate at a designated area. An owner of cats and dogs typically is required to maintain the litter container clean on a daily basis as the pet waste, both urine and feces, diffuses a strong smell inside of the house.

Traditionally, the litter containers are designed as top-open boxes made of a waterproof material with no electric conductivity, such as plastic. To function as a litter tray, some textured materials can be placed inside so that pets can feel natural urges for urination and defecation. For example, clay, sand, litter granules, grains, pellets or tablets inside the litter container can provide "digging and burying" feel; especially for cats. Contrary to the benefits of such litter materials, the used portions or "soiled" litter materials should be replaced daily to remove the odor of the urine and feces from the litter box in order to maintain a sanitary environment. The strong odor of feces can instantly arise once pets use the litter box but will dissipate as it dries. However, the presences of the ammonia smell in urine will continue to remain unless controlled in some manner such as deodorizing the litter or storing it for later removal in a separate odor neutralizing compartment.

The litter materials for the litter boxes can be distinguished in two types: absorbent litter and non-absorbent litter. One sub-category of absorbent litter forms clumps when absorbing moisture from both, urine and feces. The clumps formed by urine and feces can then be more easily disposed of by the pet owner and the untouched absorbent litter in the litter box can remain intact for next use. Absorbent clumping litter became a mainstream litter system over traditional absorbent clay litter for indoor pets due to the benefits and advantages of easier maintenance than with traditional clay litters where feces and urine are allowed to stand mixed together without the benefit of separation provided by clumping. However, the most common method of disposition for all absorbent litter is largely restricted to using plastic bags and placing it into the garbage. While this is the final step for the pet owner it is not so for the local municipality. The waste then needs to be further transported by truck to the often-overcrowded local landfill. Some absorbent litters are advertised as being flushable into a toilet. All absorbent litters quickly deagglomerate or break down into their original component contents when submerged in water but they do not totally dissolve; they merely break down (deagglomerate) into their component parts. As a result, there is no currently available litter that is truly flushable and capable of passing through the mesh screens of sewer or septic systems without eventually resulting in clogging. That leaves the pet owners with a less-environmental friendly option, such as a landfill. Further, absorbent litters, because of their ability to retain moisture, also cause the wetted, decomposed materials from which they are made, to adhere to a pets' paws during the process of "digging and burying". When litter ends up being scattered outside of the litter box it is known as "tracking" and can be identified as being either "high" or "low" depending upon the degree to which it scatters when compared to other litters.

To the contrary, some, but not all, more recently introduced non-absorbent litters are much lower tracking than any absorbent litter because of their heavier weight and the fact that they do not absorb but rather, repel urine. Some non-absorbent litters can be washed and reused. However, this feature is seldom a choice used by pet owners, as it requires the very inconvenient task of washing and straining in order to remove dried feces and urine from the surface of the litter and then drying before it can be used again. Most pet owners simply prefer to purchase a new fresh container of litter. One main attribute of the newer non-absorbent litters is that they last much longer than absorbent clay or clumping litters. They will last for a month or more when used by one animal before a fresh supply is needed in the litter box. This same change is most often required each week when using absorbent litters. Besides longevity, and as a result, lower cost; the main advantage of non-absorbent litters is that they provide the same sanitary conditions of separating urine from feces as clumping absorbent litters; however, separation is achieved by using a different method: Separation of urine from feces is achieved by using a non-absorbent litter in conjunction with a liquid urine separating litter box, which typically comes with two separate compartments: (1) a top tray containing litter and (2) a lower liquid holding compartment. The top litter tray has a perforated bottom with holes small enough to prevent litter from falling through but large enough to allow urine to pass freely through and into the liquid holding compartment below. Currently, the collected urine remains in the liquid holding compartment until it is manually removed. The odor of pure, undiluted urine is very offensive and when neglected, the removeable container can overflow. One method of resolving this problem has been to design the lower holding compartment with a slide-out drawer containing urine soaking pads instead of storing pure, undiluted urine. The urine pads can be costly for pet owners, as pets tend to urinate 2-3 times a day and when over-soaked, can also be problematic to remove and clean. In addition, cats, in particular, are habitual animals and usually face the same direction, either the front or back of the litter tray, when urinating. Thus, the pads become over-soaked at one end and unused at the other. One solution pet owners have used to solve this problem is to cut the pads in half and rotate them. However, this results in just one additional chore. Further, ingestion of litter by animals is not uncommon. Traditional clay as well as clumping litters often contain harsh chemicals. In addition, non-absorbent litters, even when devoid of harmful chemicals, do not dissolve in the warm intestines of an animal and can become stuck like little rocks. Some very high veterinary bills and even some deaths have even been reported as a result of these causes. The safety of the litter is always questionable. Alternatively, both absorbent and non-absorbent litters have been manufactured with biodegradable ingredients that degrade in landfills. However, some biodegradable litters, corn based for example, are notorious for becoming infested with "little bugs" while in the litter tray which is not pleasing to pet owners. In addition, biodegradable litter, because of its light weight, is most often high tracking.

To reduce maintenance on the part of the pet owners, some litter boxes are automated to mechanically scoop, rotate, rake, or shift both feces and urine-soiled clumping litter. However, such scooping-type automated litter boxes merely set aside the clump waste into a separate storage compartment for later disposal and require additional cleaning and maintenance for their automated mechanical devices to the degree at which many pet owners return to using their non-automated litter boxes instead. One example of a washable automated litter box using non-absorbent litter is a system designed to scoop feces and flush urine each time the box detects pet entry. Urine and feces are both flushed out from the box through a drain hose and into a toilet bowl. Prior to flushing, non-absorbent reusable plastic granules, used for litter, as well as feces and urine are all mixed and washed in a slurry of liquid detergent and water. The plastic granules are separated from this mixture and the slurry is flushed into the toilet bowl where some of it always remains until the toilet is later manually flushed. The remaining plastic litter granules are then electrically blow-dried for reuse.

Although with the convenience to the pet owners and waste free benefits, this washable automated litter box does not solve all the problems that the current litter boxes encounter. First, the automated litter system adds more features for automation, which results in requiring more maintenance for each feature. For example, the washable automated litter box still requires additional cleaning for the rake that scoops the feces and a container and mixing tool that mixes and mashes the feces and liquid to form the feces-urine-water slurry mixture. This washing phase of the box seldom completely cleans the rake-mixing tool, the container itself or the plastic litter granules. Further, the feces-urine-water slurry mixture can clog the impeller driven pump or the drain hose. Impeller driven pumps are especially susceptible to hairballs that are common components of fecal deposits in cats and use of this kind of pump will eventually contribute to the problem of clogging.

Another problem is the noise of the system by the continuous processes of moving the rake to collect feces, stirring and washing the granules, mixing the feces and urine all with a special added liquid detergent. The final action that remains is drying the separated plastic granules with a noisy blow-drier. The entire cleaning cycle lasts for approximately 35 minutes; which is known as "downtime". In addition, cleaning the washable granules with the detergent and water and drying the granules with a heater each time the system detects entry by a pet is not energy efficient. This is costly as the system turns on whenever each pet uses the box, at least 3 times a day. Sometimes, due to a fault detector when something in the cycle fails, a loud alarm will sound. This is a necessary feature that is a result of its complicated design but not well received by pet owners when it sounds-off in the middle of the night. If the raking, washing and drying steps are programmed based upon a preset starting time, the odor of the feces and urine in the box could be problematic while the system is not set to run. One annoying problem reported with this system is the result of dried waste. Over time, feces, as well as urine stains, adhere to hidden surfaces within the internal components of the box. This results in filling the house with a very offensive odor whenever the drier is subsequently used. Safety is another concern to the automated washable litter box as the system uses a liquid detergent, at an added expense, which contains harmful chemicals regardless of the safety claims from the manufacturer.

All currently automated litter systems, because of the ways in which their automated cycles initially start, are always subject to the problem of having their cycles initiated and completed at times when it is not necessary. There are two starting methods used: first, entry detection and second, pre-programmed starting times; some offer a choice of both. Instead of starting immediately, most systems also provide a time delay, usually about ten minutes, before the cycle begins in order for an animal to leave the scene. Cat behavior, especially, is the reason why both of these methods are imperfect. On average, cats urinate twice per day and defecate once. When entering the litter box, they have three choices: they will either defecate or urinate, but never both at the same time; or, not uncommonly, will only paw around the litter for a while and then leave the scene without having deposited any waste at all. With entry detection, a needless and wasteful cycle will occur even though no waste has been deposited. One reason why pre-programmed options are also available is result of excessive noise created during automatic cycles that occur at inopportune times for pet owners. Options for different more convenient times to start cycles are available for each day. This too is subject to unnecessary cycles. For example, if a timer is set for every 24 hours, and the animal defecates one minute after a cycle has just completed, then that cycle was not necessary at that time. That same waste plus any additional waste, will remain in the litter tray until the next day instead of being removed in a more timely fashion.

A better sanitary and environmentally friendly automated pet litter box, which requires the least amount of effort to keep clean and brings electronic and mechanical reliability in a simplified form without requiring many moving parts, as well as one that does not rely upon the fallible "entry" or "pre-programmed" starting systems, is needed to address all the problems listed above.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. The urine flushing pet litter box may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, the subject matter disclosed herein may be directed to a urine flushing pet litter box. The pet litter box is manufactured as a combination of a urine-separating pet litter box with a urine odor-controlling, conditionally non-absorbent litter and an automatic "flushing & filling cycle" based upon electronic water chargers and sensors and electrical water valves. The urine discharged inside of an upper litter tray is immediately filtered through a perforated bottom of the upper litter tray into a lower liquid holding tank containing a predetermined level of water. The pet litter box has two hoses. One is connected to the output wall-valve used to supply pressurized water to the toilet, via a flexible hose, while the other serves as a drain hose into the top of the a holding tank of the toilet. Emptying and filling water from the "Liquid Holding Tank" is controlled by two electrical solenoid water valves within the plumbing section. Flushing of the holding water in the lower liquid holding tank is not triggered by "entry" or a "pre-programmed timer" resulting in the problems discussed above, but rather by a sensor that senses a threshold water level in the lower tank due to an increase in height as a result of urination by pets. This may be a 10% increase added to the original predetermined initial fresh water level in the tank. Thus, the flushing is performed at minimum frequency to save energy and water and is initiated only when a specific amount of urine has been added to the liquid holding tank. Further, the ratio between the holding water and urine is strictly maintained as 9:1 at maximum so that the holding water always neutralizes the odor of urine. The process of flushing, vacuums the holding water from the tank containing urine into the drain by using a Venturi pump that operates by water pressure alone and contains no moving parts that can become clogged. The opening and closing of two electrical water valves for filling and draining are electronically controlled. Flushing begins when the contaminated (with urine) water level in the lower liquid holding tank reaches a certain high-water level. When this occurs, a water-level sensor causes one of the electrical valves to open. Water immediately begins to drain from the tank until it reaches its lowest level. At this time, the low water sensor causes the valve to close and the other to open causing fresh water to fill until it reaches the normal fill level again. At this water level, the valve closes and the water stops filling. The electronic controller then goes into its dormant stage. Approximately four days later, with use by one animal, this "Flush & Fill Cycle" will repeat itself when urine contaminated water again reaches the maximum allowable fill level. It does not matter how many animals use this system, nor does the capacity of their bladders; the cycle will merely occur more often. The duration of each cycle will vary in relation to the size of the plumbing components. In one embodiment, when using the same ¼-inch diameters for the Venturi pump and solenoid water valves, the duration of one "Flush & Fill" cycle will last for approximately five minutes and it is much quieter than a flushing toilet.

The conditionally non-absorbent litter, which will later be discussed in detail, is placed into the upper liquid draining litter tray and has very slow dissolving characteristics while in this environment. This litter is only exposed to moisture when the urine passes from the animal, through the perforated bottom of the litter tray and into the tank below. This minimal exposure to urine results in a litter that will last for over a month when used by one animal before a change is required. While these same characteristics above are true for all non-absorbent litters, none of them are flushable.

Due to the simple configuration, the pet litter box is reliable and sanitary without frequent maintenance. Further, the conditionally non-absorbent litter is safe for pets, even in case of ingestion, and is also very low tracking due to its weight. These and other advantages will become more apparent in the detailed descriptions below with respect to FIGS. 1-5.

Figure 1:
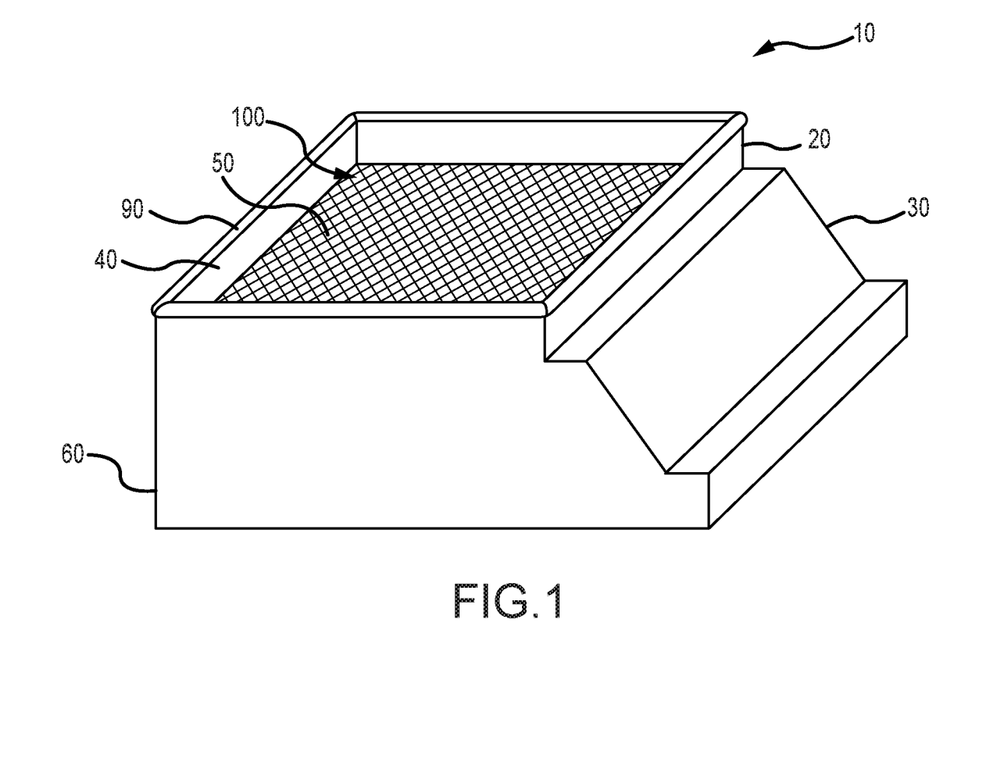
FIG. 1 is a urine flushing pet litter box according to an embodiment of the subject matter disclosed herein.

FIG. 1 is a urine flushing pet litter box 10 according to an embodiment of the subject matter disclosed herein. The urine flushing pet litter box system 10 is generally described as follows; The litter box 20 further includes a removable top-open upper litter tray 40 with a perforated bottom 50 and a lower liquid holding tank (not shown, see further FIG. 2, 70), which is placed under the upper litter tray 40 to collect urine (not shown, see further FIG. 2) discharged in the upper litter tray 40 through the perforated bottom 50, and a support base 60 to hold the upper litter tray 40, lower liquid holding tank and plumbing and electrical component storage (not shown, see further FIG. 2) inside. The upper litter tray 40 and lower liquid holding tank are further described in FIG. 2 in more detail.

The access ramp 30 provides access for pets to the upper litter tray 40. The height of the support base 60 may be designed to be seven inches to ten inches. The access ramp 30 may be designed as built-in steps, slowly inclined slope, or combination thereof. The access ramp 30 would help the pets, especially smaller pets, to access the upper litter tray 40. The access ramp 30 may be made of plastic, metal, wood, and other materials. Further, the surface of the access ramp 30 may be covered or coated with anti-slip rubber or carpet for easier access. The liquid holding tank may include an electrically non-conductive material such as plastic in order to keep the method of installing electric chargers and sensors as simple as possible.

Figure 2:
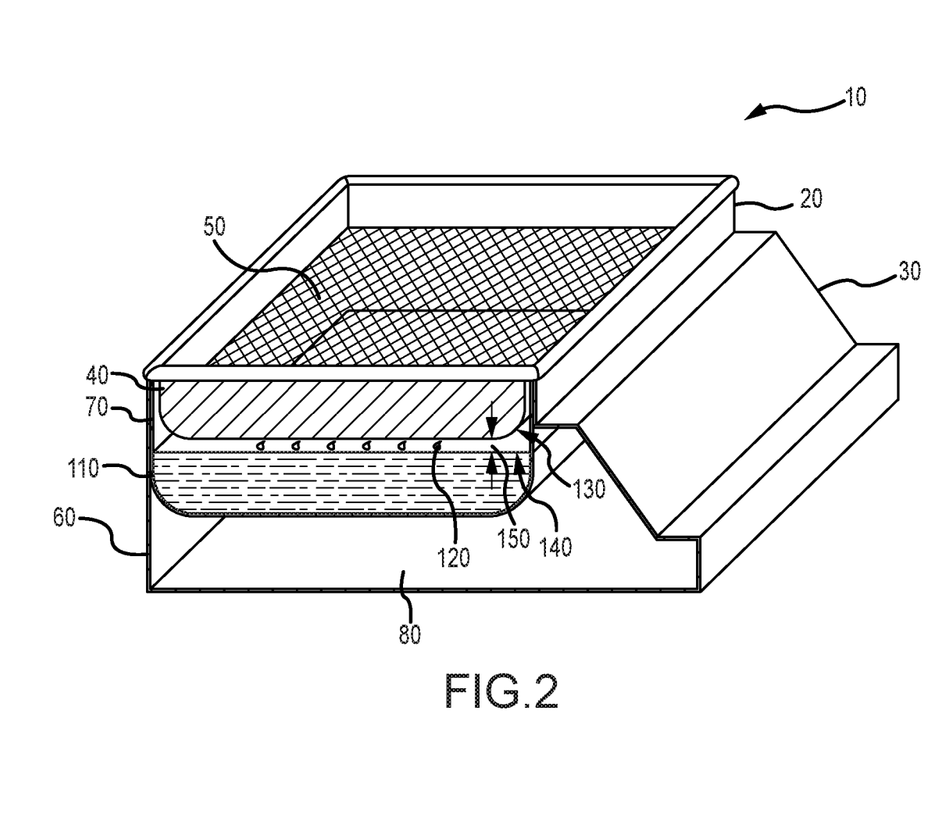
FIG. 2 is an internal view of the urine flushing pet litter box of FIG. 1 according to an embodiment of the subject matter disclosed herein.
Figure 6A:
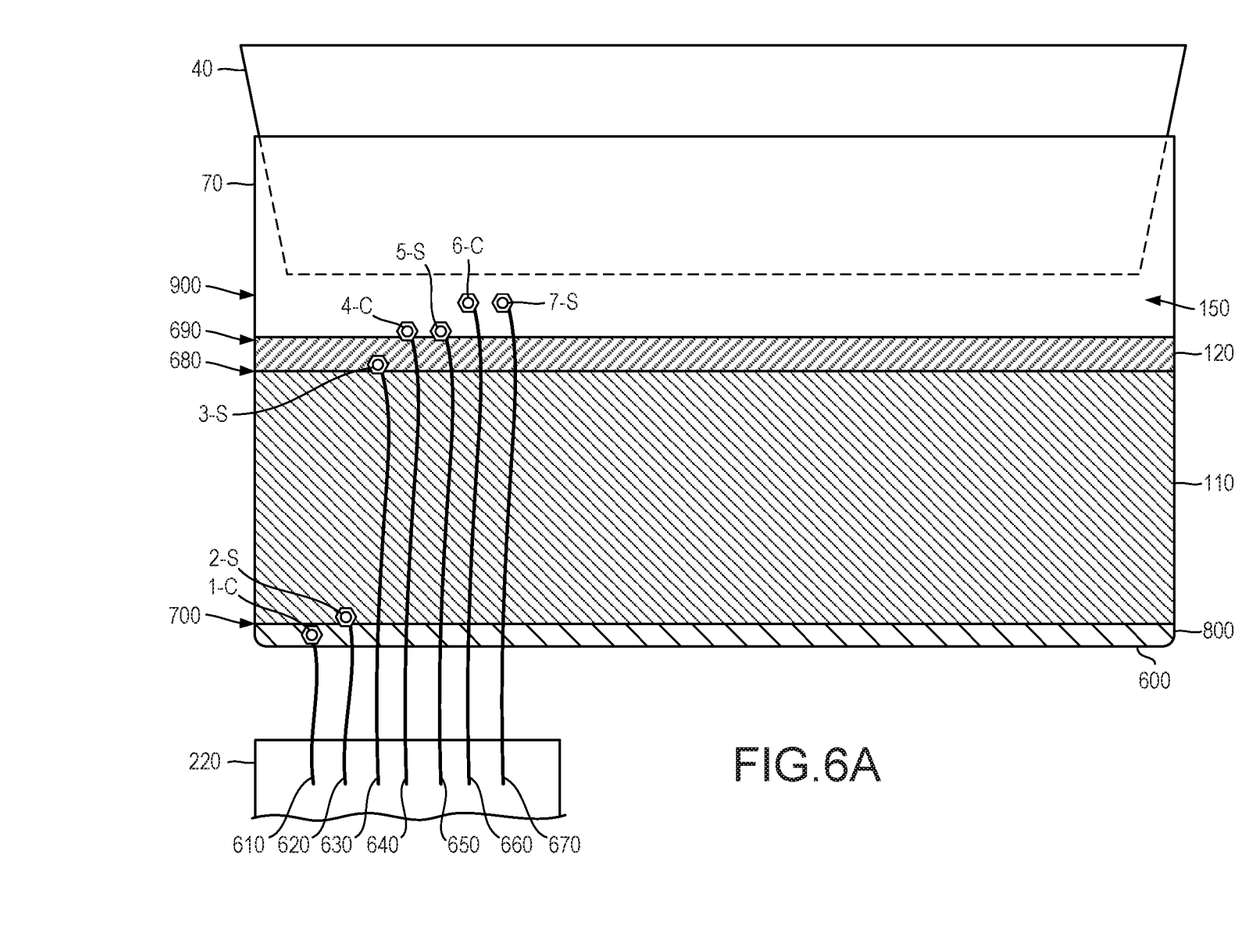
FIG. 6A is a side internal view of the litter box system of FIG. 1 with electric water chargers and sensors as well as a controller according to an embodiment of the subject matter disclosed herein.

FIG. 2 is an internal view of the urine flushing pet litter box 10 according to an embodiment of the subject matter disclosed herein. In FIG. 2, the litter box system 10, is shown as three components; the upper litter tray 40, lower liquid holding tank 70, and plumbing and electrical components compartment 80. The upper litter tray 40 is typically set above the lower liquid holding tank 70 when the litter tray 20 is in use but is also completely removable from the base 60 for easy cleaning. 20. In one embodiment, the upper litter tray 40 may be nested above the lower liquid holding tank 70 by having angled sidewalls so that the top part of the walls of the lower liquid holding tank 70 support the angled sidewalls of the upper litter tray 40. The embodiment is further described in FIG. 6. In a further embodiment, the upper litter tray 40 may sit at the top of the lower liquid holding tank 70 by ridges 90 formed around the opening top of the upper litter tray 40. In a still further embodiment, the upper litter tray 40 may sit at the top of the lower liquid holding tank 70 by a holding mechanism (not shown), such as a hook or clasp. In a still further embodiment, the upper litter tray 40 may be a sliding mechanism placed at the top of the support base 60. The upper litter tray 40 and the lower liquid holding tank 70 may be rectangular-shaped, square-shaped, round-shaped, or in any other shape. The perforated bottom 50 may be created with a multiplicity of liquid drain holes 50 at the bottom of the upper litter tray 40. In one embodiment, the perforated bottom 50 may be a sieve, colander, mesh, basket, or filter. In case the perforated bottom 50 is mesh or filter, the perforated bottom 50 may be able to support the weight of pets and litter materials placed inside of the upper litter tray 40.

In one embodiment, the overall dimensions of the litter box 10 are as follows: length, 14 inches, width, 10.25 inches and height, 9.5 inches. In a further embodiment, using ¼-inch plumbing instead of ½-inch, and placing the plumbing compartment at the rear instead of below the liquid holding tank, 80 (shown in FIG. 2) the height can be lowered to only 7 inches; this is not much higher than some large traditional open litter boxes. As described above, it could be made in any number of shapes and sizes. However, since its location must always be adjacent to a toilet for a source of pressurized water in order to operate the Venturi pump and as a drain disposal, this location does effect and limit the practical width of the litter box 10. In many bathrooms, cabinetry often limits the available areas at the sides of toilets. As a result, a width of no greater than 12 inches would result in greater potential use for more homes, due to its relatively narrow width, but would continue to have the ability to accommodate all but the very largest of indoor pets.

The upper litter tray 40 is typically filled with conditionally non-absorbent litter materials (not shown) to urge pets to urinate and defecate inside of the upper litter tray 40. The conditionally non-absorbent litter materials may take the form of granules, grains, pellets or tablets. In one embodiment, the size of each of the conditionally non-absorbent litter materials may be larger than each hole 100 of the perforated bottom 50 so that the conditionally non-absorbent litter materials stay on the perforated bottom 50 without dropping into the water filled liquid holding tank. 70 The conditionally non-absorbent litter materials are described further in FIG. 7.

Still referring to FIG. 2, the lower liquid holding tank 70 is designed to hold water 110 inside so that the urine 120 dropped from the upper litter tray 40 through the perforated bottom 50 is poured into the hold water 110. The bottom 130 of the upper litter tray 40 should not touch the surface 140 of the hold water 110 in the lower liquid holding tank 70 so that the amount of the hold water 110 in the lower liquid holding tank 70 is adjusted. In fact, between the bottom 140 of the upper litter tray 40 and the surface 140 of the holding water 110, there may be a space 150. The plumbing and electrical component compartment 80 may house plumbing (not shown, see further FIG. 3) connected to intake fresh pressurized water into the lower liquid holding tank 70 and to drain the hold water 110 containing urine 120 and electrical component (not shown, see further FIG. 3), such as power component and controller, to operate the litter box system 10 for automatically flushing the hold water 110 containing urine 120 from the lower liquid holding tank 70 and refilling same with fresh water; the "flush & fill cycle". The embodiment is further described in FIG. 3.

Figure 3:
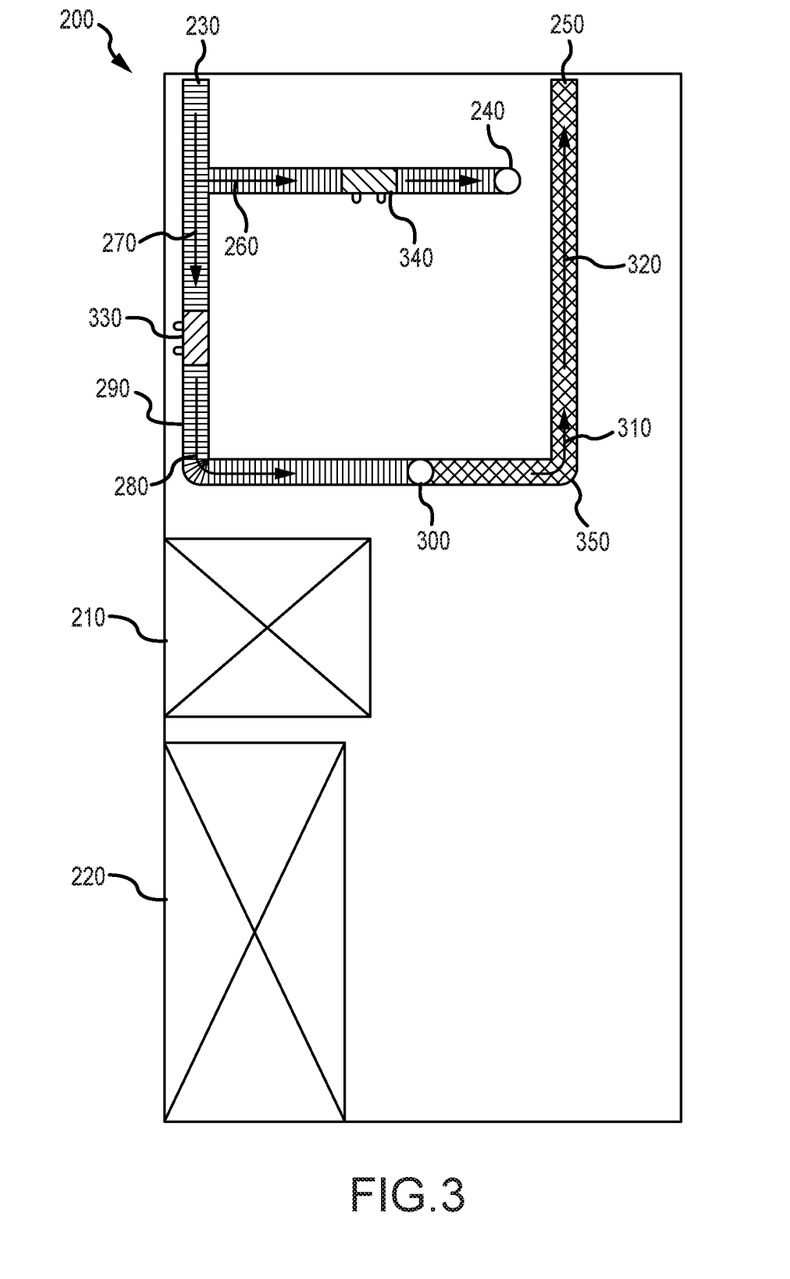
FIG. 3 is a top internal view of the urine flushing pet litter box of FIG. 1 according to an embodiment of the subject matter disclosed herein.

FIG. 3 is a top internal view of the urine flushing pet litter box 10 of FIG. 1 according to an embodiment of the subject matter disclosed herein. The plumbing and electrical component compartments located at the lowest level, 200, 220 may be a rectangular box to house a plumbing 200, power supply component 210, and controller 220. FIG. 3 shows one embodiment of the placement of the plumbing 200. The plumbing 200 includes a plurality of pipes connected to each other and have at least one inlet end 230 and two outlet ends 240, 250. The inlet end 230 is connected to an outside water source (not shown) to receive water into the lower liquid holding tank. 70. The flow of the incoming water is shown as arrows 260, 270, 280 in the pipes. The water coming into the plumbing 200 through the inlet end 230 flows through the pipes and discharges out from one of the outlet ends 240, which is connected upward from the bottom of the liquid holding tank 70. The pipes flowing the water 260, 270, 280 may function as water intake pipes 290. The outlet end 250 is connected to a drain hose (not shown) in order to discharge urine contaminated water from the plumbing. 200.

In addition to the inlet end 230, that receives household pressurized water, there is another inlet hole 300 directly connected to the Venturi pump that vacuums contaminated urine water from inside the liquid holding tank. 70 and out the drain 250. In one embodiment, inlet hole 300, a component of the Venturi Pump, may be molded into the bottom 130 of the upper litter tray 40 functioning as a drain. In a further embodiment, the inlet hole 300 may be enclosed with a cover, such as a filter or screen, to prevent objects dropping down into the inlet port of the Venturi Pump. 300. As described above, urine 120 is added to the hold water 110 and the urine-mixed water flows into the drain in the direction indicated by arrows 310, 320 and through the outlet end 250. The plumbing 200 also includes at least two normally closed—N/C) solenoid water valves. For clarity, valves 330 and 340 will also be referred to as Valve-E and Valve-F with regard to their respective functions of "emptying" and "filling" the tank.

When Valve-F 340 opens, it fills the tank with fresh water to a predetermined level via the pressurized water route 230,260,240. When Valve-E, 330 opens, the incoming flow of the water 230, 270, 280 as well as the outward flow of wastewater 310,320,250 from the Venturi Pump siphon-intake, 300 empties the tank. They never open at the same time. Thus, the pipes draining the water 310, 320 may function as a drainpipe 350. In one embodiment, to connect the plumbing to the water source and drain, the plumbing 200 may be placed toward the backside end of the compartment 80.

Figure 4:
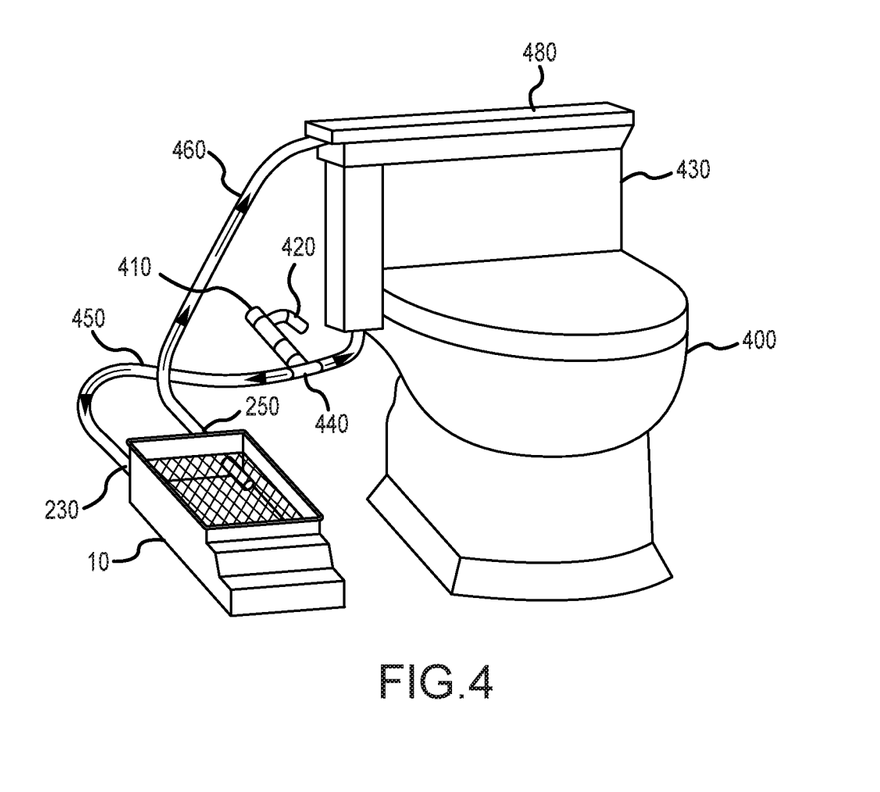
FIG. 4 is a view of the urine flushing pet litter box of FIG. 1 connected to a toilet according to an embodiment of the subject matter disclosed herein.

FIG. 4 is a view of the urine flushing pet litter box 10 of FIG. 1 connected to a toilet according to an embodiment of the subject matter disclosed herein. The urine flushing pet litter box 10 may be placed adjacent to a toilet 400 for two reasons: the litter box 10 is capable of obtaining fresh water from the pressured water intake pipe 410 for operating the Venturi Pump (see FIG. 5, 510, 520, 530) and draining wastewater through a drain system of the toilet (see FIG. 4, 400). A toilet 400 used in a household usually connects to the pressured water source through a water intake pipe 410 extending from a wall and the water flow is controlled by a shut-off valve 420 on the water intake pipe 410 typically located under a hold water tank 430 of the toilet 400. In one embodiment, the water intake pipe 410 may need to be attached to a T-shaped connector 440 so that the existing pressured water intake pipe 410 is capable of supplying fresh water into both, the hold water tank of the toilet 430 and the litter box 10. The fresh water flows into the litter box

10 through the inlet end 230 via an inlet hose 450 and (see FIG. 5) provides fresh pressurized water via inlets 260 and 270 to the intake ports of the N/C (normally closed) solenoid water valves; Valve-E, 330 and Valve-F, 340. When water Valve-E, 330 opens, as a result of electronic water-level sensing to be described later, the water flows, 280 to the intake 530 of the Venturi pump. Vacuum intake port 510 of the Venturi pump then begins to siphon waste water from the liquid holding tank 70. It then flows from the outlet end of the pump 520 and continues via 310 and 320 to outlet 250. (see FIG. 4) It then continues via outlet hose 460 upward and under the lid of the toilet where it is directed into the overflow pipe of the toilet or simply into the toilet holding tank water as long as it does not interfere with its float valve mechanism. There is no need to hand flush the toilet, as the overflowing water will automatically drain. In one embodiment, the ¼-inch plumbing system, the discharge hose 460 has an outside diameter of only 5⁄16ths of an inch. The plastic tubing, unlike FIG. 4 that is enlarged to show flow, is directed upward from the space between the back of the toilet and the wall. It is barely visible and may be of hard composition to support the weight of the toilet lid or, alternatively, placed alongside a 5⁄16$^{th}$ inch riser. The forward tilt of the toilet lid is minimal.

Figure 5:
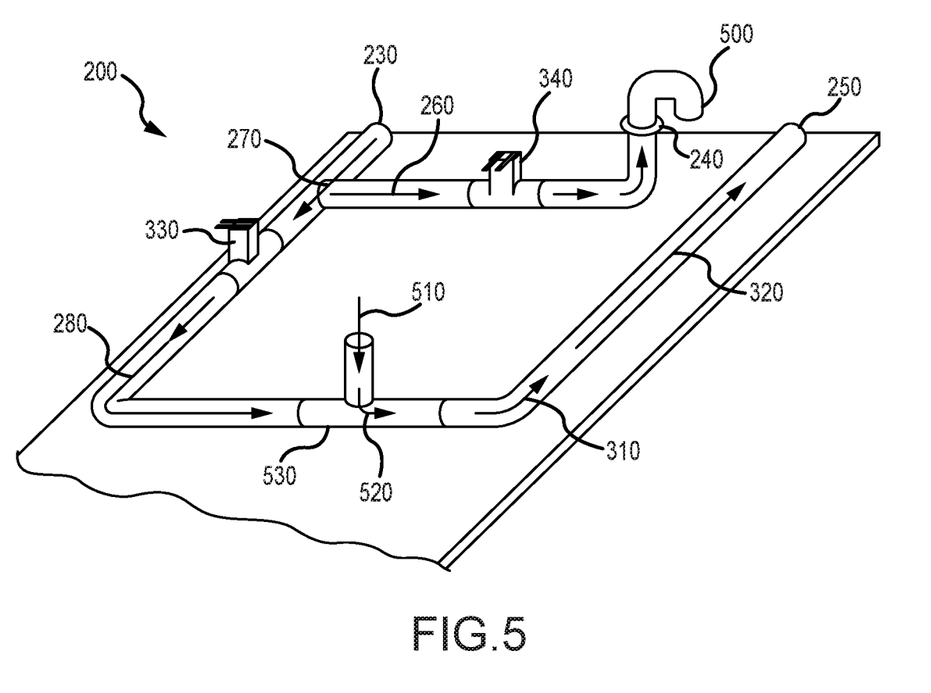
FIG. 5 is a side view of the plumbing of FIG. 3 according to an embodiment of the subject matter disclosed herein.

In FIG. 5, whenever water has been emptied from the liquid holding tank, 70 Valve-E, 330 closes and simultaneously, Valve-F, 340 opens. When Valve-F, 340 opens, fresh water begins to fill the holding tank 70 via outlet 240 until it reaches the normal fill level. (FIG. 6) 680. In one embodiment (FIG. 5) when the plumbing is located underneath the liquid water container, an inverted U-shaped pipe functioning as a faucet 500 is attached, water-tight, through the bottom and to the inside of the liquid holding tank 70.

In this configuration, pressured fresh water 260 is directed downward and does not shoot up to the bottom of the upper litter tray 40 when fresh water 260 fills the lower liquid holding tank 70. Without the inverted U-shaped pipe, water would shoot directly upward where it would penetrate the perforated bottom 50 of the upper litter tray 40 and soak the litter. In another embodiment (not shown) when the plumbing components are less than ½ inch, all of the plumbing can be located at one end of the litter box 10 instead of underneath. This would allow incoming water to be directed downward and there would be no need for the U-shaped fitting 500.

Referring back to FIG. 3, the electrical component may include power supply component 210 and controller 220. The power supply component 210 supplies electricity to the controller 220. In one embodiment, the power supply component 210 may include a rechargeable or non-rechargeable battery, fuel cell, generators, alternators, and another power supply. In a further embodiment, the power supply component 210 may be plugged into AC/DC power supplies. In one embodiment, the power supply component 210 may be designed as a lead-acid battery with 12 V DC, 5-ampere hour rechargeable, and plugged into a charger. In a further embodiment, the charging of the battery can be done automatically by controlling a switch to the battery (not shown). Further, the controller 220 is connected to the power supply component 210. In one embodiment, the controller may include a circuit board, a microcontroller, or computer devices. The controller 220 is located directly below the lower liquid holding tank 70 so that chargers and sensors (not shown, see further FIG. 6) on the controller 220 are connected by external wires to a sidewall of the liquid holding tank 70.

FIG. 6A is a side internal view of the litter box system 10 of FIG. 1 with sensors and a controller according to an embodiment of the subject matter disclosed herein. In FIG. 6A, the upper litter tray 40 is nested over the lower liquid holding tank 70. The controller 220 is located directly below the lower liquid holding tank 70. In one embodiment, the controller 220 may include complementary metal-oxide semiconductor (CMOS) integrated circuits or any other similar integrated circuits. The controller 220 is designed to extend seven wires 610-670 to one side of the liquid holding tank 70. Each of the seven wires 610-670 is connected to an electric conductive metal object, such as a screw, 1-C, 2-S, 3-S, 4-C, 5-S, 6-C and 7-S pierced horizontally through one side of the lower liquid holding tank 70. In one embodiment, the electric conductive metal objects 1-C, 2-S, 3-S, 4-C, 5-S, 6-C and 7-S may be stainless-steel screws.

Figure 6B:
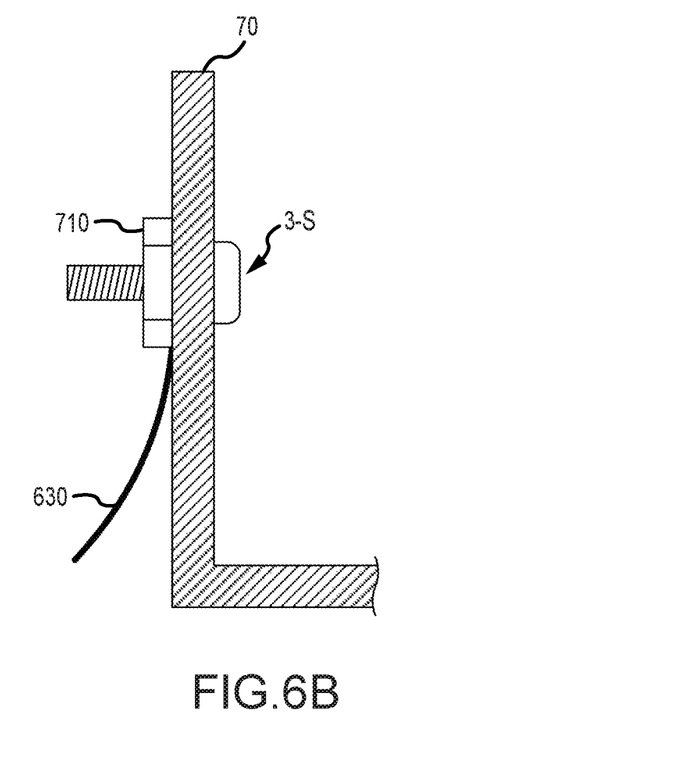
FIG. 6B is an illustration showing one example of how the chargers and sensors could be mounted onto the liquid holding tank according to an embodiment of the subject matter disclosed herein.

FIG. 6B is a view showing how chargers, sensors and wires are attached to a side of the liquid holding tank 70 according to an embodiment of the subject matter disclosed herein. In a further embodiment, the screws may consist of heads, and nuts used for connecting wires to the controller 220. FIG. 6B is an example showing how each charger or sensor is imbedded, water-tight, through a wall 70 of the liquid holding tank and how the wire 630 is externally attached by using a hex-nut 710. Any similar clamping device could be used as long as it is electrically conductive.

Generally, the holding water 110 can be used as a conductor of electricity and transfers electricity between the heads, 1-C through 7-S. In the current embodiment, the screws 1-C, 2-S, 3-S, 4-C, 5-S, 6-C and 7-S may function either as a charger or as a sensor to control or detect a water level in the holding water 110 in the lower liquid holding tank 70. For example, the letters following the numbers of each of the seven screw-head assemblies located at different levels in the tank, 70 identify whether they are chargers or sensors of electricity. Thus, 1-C, 4-C and 6-C are chargers, while 2-S, 3-S, 5-S and 7-S are sensors. The positively-charged water in the holding tank may be with the low amperage sufficient to operate the opening and closing of the solenoid valves Valve-E, 330 and Valve-F, 340 (see FIG. 5).

The screw-head assemblies 1-C, 2-S, 3-S, 4-C, 5-S, 6-C and 7-S and their wires 610-670, manage the automatic flushing and draining of the holding water 110 by using the electricity charging and sensing functions. Normally, the holding water 110 is maintained in the lower tank at a normal water level 680. When the holding water containing urine 120 reaches at a maximum water level 690, charger 4-C charges the water 110 with electricity and sensor 5-S, located at the same water level, receives the charge and sends it via wire 650 to the controller 220 where it triggers opening of electric Valve-E, 330 to drain the holding water 110. (see FIG. 5) When Valve-E, 330 opens, the flow of pressurized water into the intake port 530 of the Venturi Pump causes the suction port 510 to extract the urine-contaminated water, via outlet port 520, out of the tank 70 by way of outlet 250 and on through the toilet drain hose 460 of FIG. 4. (return to FIG. 6) When the sensor 2-S detects no electricity from water-charger 1-C, it is because the water level has been pumped to a level below sensor-level 2-S and the electrically charged water from charger 1-C is no longer in contact with sensor 2-S. The liquid holding tank 70 has essentially been pumped dry. The result of sensor 2-S being deprived of positively charged electricity, (going low) causes water Valve-E, 330 to close and simultaneously, Valve-F, 340 to open. (see FIG. 5) When Valve-F 340 is opened, it begins to fill the tank 70 with fresh water. The rising water being electrically charged by charger 1-C will reach the normal beginning water level at sensor 3-S. Wire 630 will conduct to the controller 220 and then the Valve-F, 340 is shut off and the holding water 110 is maintained at the normal water level 680 in the lower liquid holding tank 70. At this time, the flushing & filling cycle ends and the controller 220 goes into a dormant/ready stage awaiting the next cycle.

In one embodiment, the lower holding tank 70 may contain 6.75 quarts (216 ounces) of fresh water plus an additional 24 ounces of urine added over time, causing the now contaminated urine-fresh water mixture to rise to the highest maximum level normally permitted. 690. The ratio of the holding water 110 and urine 120 is maintained and the ratio for the holding water 110 may not go lower than 90 percent of the whole liquid in the lower holding tank 70. Thus, the ratio of the urine 120 may not go higher than 10 percent of the whole liquid in the lower holding tank 70. The ratio plays a significant role by controlling the urine odor of the pet litter box 10. On average, indoor cats urinate 6 ounces per day; other pets may urinate greater or lesser amounts. So, to reach the maximum water level 690 from the normal water level 680 typically takes four days for one cat. This is significantly less flushing compared to the conventional automated pet litter boxes. Further, the whole process of draining the holding water 110 that has been contaminated with urine 120 and refilling with fresh water 260 into the lower liquid holding tank 70 takes less than five minutes with a ¼-inch plumbing system. Compared to cycles lasting up to 35 minutes with some automated litter boxes, the process can be performed quietly and quickly, which further saves energy and water. The duration of an automatic cleaning cycle known as "down-time", mentioned earlier, is when it cannot be used by the animal. Because of the low level of noise created by the Venturi Pump and the solenoid water valves, it is probable that it would not inhibit use by some animals even during the filling and flushing cycle, resulting in no down-time; not even five minutes.

The lower liquid holding tank is designed to retain some water 800 at a minimum water level 700 by locating the bottom of the screw-head for sensor 2-S, slightly above the upper level of the screw-head for charger 1-C. This results in sensor 2-S becoming dry because the draining water conducting electricity from charger 1-C is no longer in contact with the screw-head of sensor 2-S. The instant sensor 2-S becomes dry, (goes low/negative) water Valve-E 330 closes; the Venturi pump stops and Valve-F, 340 opens and fresh water begins to fill the liquid holding tank again 70. The purpose is to leave some water remaining in the bottom 600 of the lower holding tank 70 at a minimum level 700 in order to prevent the noise that occurs when the suction port of the Venturi Pump is allowed to become dry. (see FIG. 5, 510)

Unlike the conventional automated litter boxes that come with frequent electric malfunction or clogging problems, the pet litter box 10 in the current embodiment is unlikely to have such problems due to the simple electronic and mechanical designs and the use of the Venturi pump effect as described above.

Referring now to FIG. 6A, the pet litter box is also designed not to overflow the holding tank by locating both, Charger 4-C and Sensor 5-S, at the maximum allowable level well below the bottom 130 of the upper litter tray 40. However, in case of an accidental overflow, the Charger 6-C and Sensor 7-S are each located at a level higher than the normal maximum allowable level 690. Charger 6-C always remains activated with a positive electrical charge whenever the DC power is turned on and set in the "Automatic Mode".

Normally, 6-C and 7-S will always remain dry. If, for some highly unlikely reason such as an electronic malfunction that would fail to turn off solenoid water intake Valve-F, 340 (FIG. 5) or some foreign object that would clog the flow of water in the plumbing system between the outlet of Valve-E, 330, the outlet 250 of the litter box and the drain hose, (FIG. 4, 460) then water would rise above the level 690 (see FIG. 6A). Upon the water-level reaching Charger 6-C, Sensor 7-S will "go high". Since Sensor 7-S is wired directly to the positive outlet of the main fuse via a negative mosfet, the fuse will blow immediately. Without electricity, both N/C (normally closed) water valves cannot open. This action would take place before any water could flow out over the open top of the liquid holding tank 70 and onto the floor.

In addition, there is a second perforated screen (not shown) covering the entire bottom of the liquid holding tank. It is composed of a solid array of holes only $\frac{1}{16}^{th}$ of an inch in diameter; much smaller than those in the perforated bottom 50 of the litter tray above 40. The suction intake port of the Venturi Pump is always below this perforated screen. Therefore, any foreign debris larger than $\frac{1}{16}^{th}$ of an inch will never enter the drain system and cause clogging. This screen, like the litter tray 40 above is designed to be lifted from the litter box 10 for easy cleaning.

Conventional pet litter boxes use absorbent litter materials to cover feces with the litter materials for a later disposal. The most common method of waste-disposal for both, feces and "soiled" or "spent litter" is by transporting it to the local landfill. The current embodiment, similarly, does not automatically dispose of feces discharged from pets; however, the feces may be disposed directly into the toilet by pet owners due to the unique characteristics of the conditionally non-absorbent litter material described below. The pet litter box 10 of FIG. 7 contains conditionally non-absorbent litter 1010 in the upper litter tray 40. When a pet discharges feces 1010 onto this litter 1010 in the upper litter tray 40, some of the litter 1010 may stick to the feces 1020. In one embodiment, this litter 1010 may control odors of urine 120. In a further embodiment, the conditionally non-absorbent litter 1010 may be made of natural minerals, which show characteristics of complete water solubility, such as Sodium Sesquicarbonate (SSC), a blend of sodium bicarbonate and sodium carbonate as 50/50. The chemical formula of the SSC is $Na_3 H(CO_3)_2$ and takes a form of white to gray needle-shaped crystals. It is commonly used for food additives in many foods and in some detergents. In a still further embodiment, the conditionally non-absorbent litter 1010 may take the form of granules, grains, pellets, or tablets to function as litter in the upper litter tray 40 and completely dissolve when the scoops of feces 1020 containing small amounts of litter 1010 are disposed of into the toilet 400. Optionally, this litter 1010 mixes with additives or binders to enhance initial non-absorbency and odor reducing effects. In a still further embodiment, the conditionally non-absorbent litter 1010 may use only specifically designed SSC pellets with a quarter-inch diameter and a half-inch length long cylindrical shape; however, the conditionally non-absorbent litter 1010 may have various sizes and shapes. Use of the term "conditionally", whenever referring to this litter, is a result of the desired characteristics of Sodium Sesquicarbonate after their crystals have been "pelletized". The SSC pellets 1010 as conditionally non-absorbent litter in the current embodiment do not dissolve quickly and maintain the shapes being exposed with a limited amount of liquid, such as pet urine, due to the material hardness. In one embodiment, the density of the SSC pellets 1010 may be 67.5 pounds per cubic feet to maintain the hardness and slow dissolving attribute by exposure to pet urine 120. The SSC pellets 1010 may remain dry in the pet litter box 10 over one month when used by one animal without requiring weekly replacement of soiled litter; as with conventional absorbent litters. Further, the SSC pellets 1010, due to the nature of their odor-control characteristics, begin to alleviate the smell of urine 120 immediately after urination takes place.

Figure 7:
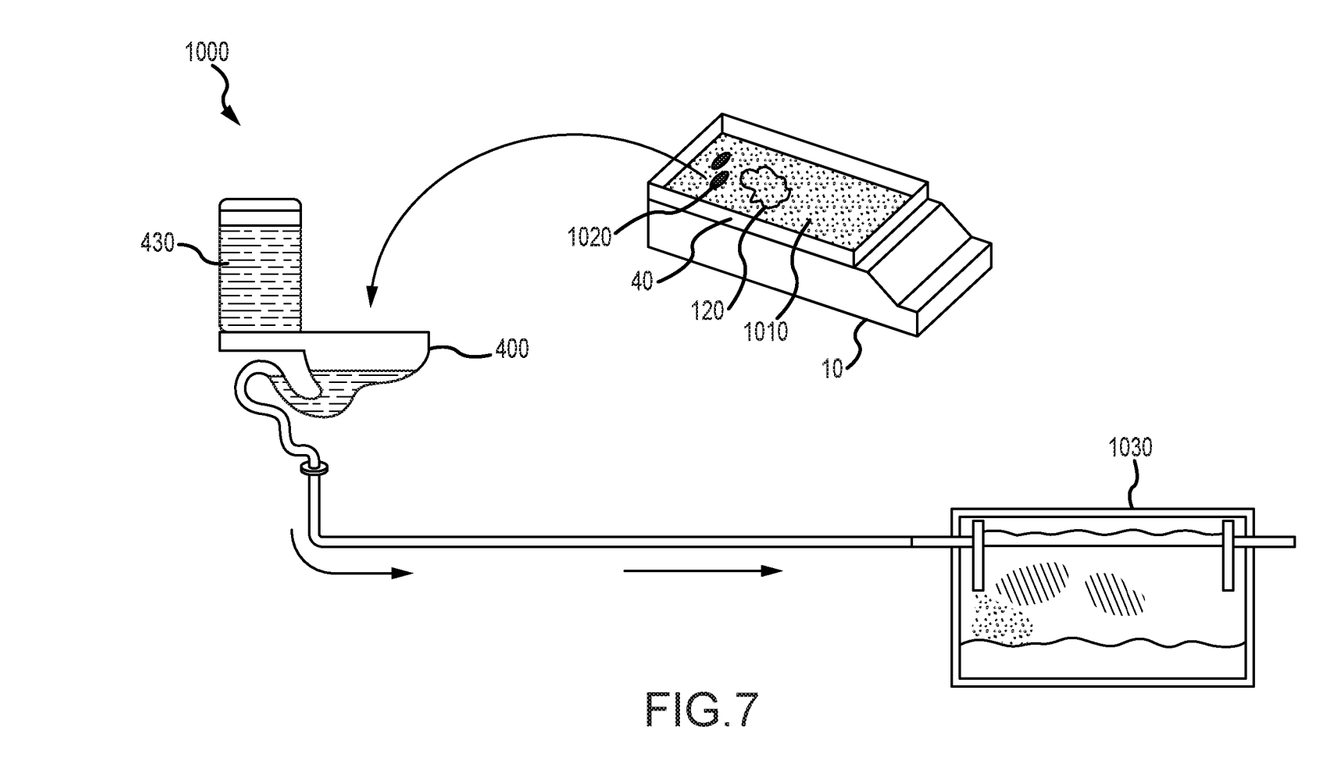
FIG. 7 is a diagram showing a scheme of feces disposal using the urine flushing pet litter box of FIG. 1 according to an embodiment of the subject matter disclosed herein.

Inevitably, some of the pet litter sticks on feces in the pet litter box due to its moisture even with a low-tracking attribute of the pet litter. All conventional non-absorbent litters currently used for the urine separating type pet litter boxes are "long-term" non-absorbable; meaning they will not degrade in a landfill in a time period of less than, at least, several months. This prohibits them from even being considered "flushable" into a toilet due to clogging problems. Thus, pet owners are generally mandated to dispose of feces and soiled litter in the landfill. By using the SSC pellets 1010, pet owners are able to scoop the feces 1020 from the pet litter box 10 and dispose of it into the toilet 400 adjacent to the pet litter box 10 in the current embodiment without clogging the toilet 400. When the feces 1020 are scooped, a small number of the SSC pellets 1010 may be carried with the feces 1020 even with its low tracking attribute; however, the SSC pellets 1010 begin to completely dissolve when placed into the water of the toilet bowl. The water holding-tank of the toilet, which typically holds 1.6 gallons of water, moves rapidly when the toilet 400 is flushed and this movement contributes significantly to the rate at which the pellets dissolve. The toilet 400 is generally connected to a sewer (not shown) or a septic tank 1030 and the SSC pellets, which are possibly carried over with the feces 1020 may be completely dissolved even before the pellets 1010 reach the sewer treatment plant or the outlet baffle of a septic tank 1030. An experiment shows that 12 percent of the SSC pellets 1010 dissolve in only 10 seconds after the flushing of the toilet 400. Further, as much as 10, 8 ounce cups of the SSC pellets 1010 may be flushed into the toilet 400 with one single flush without clogging. Thus, the SSC pellets 1010 completely replace the necessity of disposal of both, spent litter and pet feces in the landfill.

Further, the amount of the SSC pellets 1010 as salt would not disrupt the biological process that takes place in the septic tank 1030. The experiment of one entire litter tray load of 3.375 pounds of pellets, which typically may be added with 1.6 gallons of water from one flush of a toilet into the smallest septic tank 1030 of only 900-gallon capacity, results in adding only 0.0017777 percent of salt water; hardly enough to disrupt the natural biological process required in a septic tank. When flushed into a municipal sewer system with miles of drainpipes and great numbers of homes and buildings contributing constantly moving drain water, the SSC pellets 1010 may be completely diluted, dissolved and dispersed long before ever reaching the treatment plant. Further, since the SSC pellets 1010 are salts, they are safe for draining into the sewer and septic tank 1030 and will quickly dissolve within the warm, wet environment of an animal's intestines if ever ingested by pets.

After one month of use of the SSC pellets when used by one animal 1010, even with the low-tracking and odor-controlling slow dissolving attribute, the litter will eventually need to be replaced with a fresh supply. The soiled SSC pellets 1010 may be disposed of in their entirety by flushing the whole load of spent litter into the toilet 400 in 3 or 4 batches without any clogging. If the amount of the SSC pellets 1010 becomes noticeably decreasing, as a result of scooping and flushing, new SSC pellets can be added to the open-topped upper litter tray 40 as needed. However, as with all non-absorbent litters, where the objective is to allow urine to flow freely, the depth of litter in the tray should normally not be greater than two inches at most.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. An animal litter substance, comprising:
   at least one water-soluble mineral portion;
   at least one sodium bicarbonate portion; and
   at least one sodium carbonate portion;
   wherein the animal litter substance is entirely soluble in the presence of water and comprises a water dissolution rate of up to about 1.2 percent per second when the animal litter substance is flushed with water.

2. The animal litter substance of claim 1, further comprising at least one sodium sesquicarbonate portion that comprises equal parts of the at least one sodium bicarbonate portion and the at least one sodium carbonate portion.

3. The animal litter substance of claim 1, further comprising a density of less than 80 lb/ft$^3$.

4. The animal litter substance of claim 1, further comprising at least one sodium sesquicarbonate portion wherein the at least one sodium sesquicarbonate portion comprises a density of about 67.5 lb/ft$^3$.

5. The animal litter substance of claim 1, further comprising a dissolution rate of up to about 1.2 percent per second when flushed in water at room temperature.

6. The animal litter substance of claim 1, further comprising non-toxic low-tracking litter pellets designed to have hard surface with a slow-dissolving attribute when the litter pellets are exposed to urine and a more rapid-dissolving attribute when the litter pellets are flushed in water.

7. The animal litter substance of claim 1, further comprising a form factor from the group comprised of: a pelletized form factor, a tablet form factor, a granule form factor.

8. A pet litter suitable for use with a urine-separating pet litter box, comprising:
- at least one water-soluble mineral portion; and
- at least one portion comprising a substance with the chemical formula $Na_3H(CO_3)_2$;
- wherein the pet litter is entirely soluble in the presence of water at a rate of 1.2 percent per second and less soluble in the presence of urine at a rate lower than 1.2 percent per second.

9. The pet litter of claim 8, further comprising a substance suitable for flushing into a public sewer system or a septic system.

\* \* \* \* \*